UNITED STATES PATENT OFFICE.

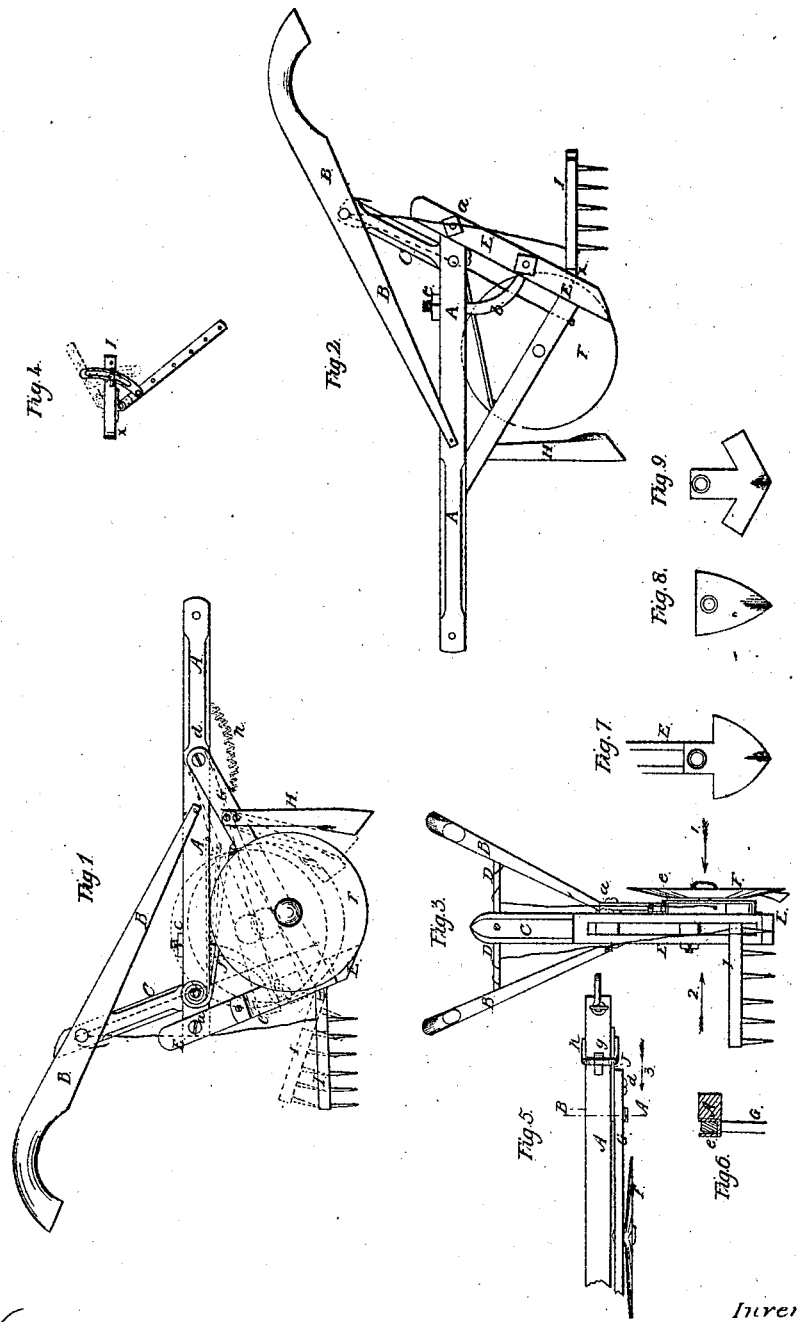

THOMAS H. DODGE, OF WASHINGTON, DISTRICT OF COLUMBIA.

IMPROVEMENT IN COTTON-CULTIVATORS.

Specification forming part of Letters Patent No. 29,147, dated July 17, 1860.

*To all whom it may concern:*

Be it known that I, THOMAS H. DODGE, of Washington, in the District of Columbia, have invented certain new and useful Improvements in Machines for Cultivating Cotton and other Plants; and I do hereby declare that the following is a full, clear, and exact description of the same, reference being had to the accompanying drawings, forming a part of this specification, in which—

Figure 1 represents a side view of my improved machine, looking in the direction of arrow 1, Fig. 3. Fig. 2 represents a similar view, looking in the direction of arrow 2, Fig. 3. Fig. 3 represents a rear view of the machine.

In the drawings, A represents the draft-beam of the machine, with handles B B, sustained in rear by braces C D. The part E of the plow is hinged to the rear of the beam A, as shown at $a$, and also connected to A by an adjusting-arm, $b$, whereby it can be adjusted by means of the nut C.

F represents a wheel, which turns on a spindle or journal in the arm or brace G, which in turn is hinged to the side of beam A, as seen at $d$. The lower end of arm G works in a guide, $e$, while a spring, $f$, bears upon its upper side to keep it down.

The wheel F is beveled off on the side next to the plow.

H represents a colter attached to the arm G, and is consequently self-adjusting.

I represents a harrow or stirrer pivoted to the rear of the plow, so that it can freely adjust itself to the inequalities of the ground. This stirrer can be made with any number of branches, and the branches may be so connected as that they can be adjusted to stand at different angles to each other and to the piece which is hinged to the plow, as shown in Fig. 4 of the drawings. In making the harrow or stirrer it is best to make one branch shorter than the other, as shown in Fig. 4, so that the plow can run close to the plants on that side, while the opposite branch of the stirrer will extend toward the other row of plants, and thus harrow up and destroy the weeds between the rows of plants.

Cords or chains extend up from both the harrow and arm G, as fully shown in red lines, Fig. 3, whereby the attendant can elevate either at pleasure, as shown in red lines, Fig. 1.

The plow part E may be made so as to have its lower end answer as the device for turning over the earth; or different shares may be used, as shown in Figs. 7, 8, and 9. In the latter case the shares would be bolted to the lower end of E, as shown in Fig. 7.

The colter H can be made or hinged so as to set at different angles and in different positions on the arm G.

The operation is as follows, viz: As the machine is drawn forward by the beam A the plow-share attached to E turns the earth toward the plants, while the guard or shield F prevents it from falling on and covering up the same. The colter H, which runs in advance of the shield F and the plow, scrapes the top of the earth away from the plants, thus cutting up the weeds, while the plow which follows turns back the earth toward the plants. The harrow or stirrer I, which follows the plow, tends to pull up the weeds and loosen the earth to such an extent that by passing twice between the rows the weeds are not only cut up, but the soil is well turned up toward the plants.

As the guard F and colter H can rise and fall independently of the plow, it will be seen that the action of the machine is much more easy than would be the case if the parts were not so arranged as to be self-adjusting. In passing over the hills of plants the shield F will rise and fall freely, while the plow is also free to bury itself in the soil between the rows. In turning the machine at the end of the rows the attendant can easily raise both the stirrer and shield by means of the cords or chains, as shown in red.

Having described my improvement, what I claim as new, and desire to secure by Letters Patent, is—

1. In combination with a plow or cultivator, the self-adjusting rotary shield F, arranged to protect the young plants, as described, and as shown in Fig. 1.

2. In combination with a plow or cultivator, the self-adjusting guard-colter H and rotary shield F, as and for the purposes set forth.

THOMAS H. DODGE.

Witnesses:
JOHN S. HOLLINGSHEAD,
JOHN QUINCY ADAMS.